United States Patent [19]
Burton et al.

[11] Patent Number: 5,764,208
[45] Date of Patent: Jun. 9, 1998

[54] RESET SCHEME FOR SPATIAL LIGHT MODULATORS

[75] Inventors: Mark L. Burton, Dallas; Donald B. Doherty, Richardson, both of Tex.

[73] Assignee: Texas Instruments Incorporated, Dallas, Tex.

[21] Appl. No.: 736,169

[22] Filed: Oct. 23, 1996

Related U.S. Application Data

[60] Provisional application No. 60/006,139 Nov. 2, 1995.

[51] Int. Cl.$^6$ ...................................... H04N 5/74
[52] U.S. Cl. .................. 345/85; 348/755; 348/770; 345/99
[58] Field of Search ................... 345/85, 99, 100; 348/755, 758, 759, 770

[56] References Cited

U.S. PATENT DOCUMENTS

| | | |
|---|---|---|
| 4,725,832 | 2/1988 | Lorteije et al. ............... 340/783 |
| 4,740,785 | 4/1988 | Stroomer et al. ............. 340/783 |
| 5,278,652 | 1/1994 | Urbanus et al. .............. 358/160 |
| 5,285,196 | 2/1994 | Gale, Jr. . | 
| 5,668,611 | 9/1997 | Ernstoff et al. .............. 348/771 |

FOREIGN PATENT DOCUMENTS

| | | |
|---|---|---|
| 0 467 048 A2 | 1/1992 | European Pat. Off. . |
| 0 658 868 A1 | 6/1995 | European Pat. Off. . |

*Primary Examiner*—Steven Saras
*Assistant Examiner*—Vincent E. Kovalick
*Attorney, Agent, or Firm*—Julie L. Reed; James C. Kesterson; Richard L. Donaldson

[57] ABSTRACT

A method for causing a micromechanical spatial light modulator to display data for a period less than its settling time. The modulator elements receive a first pulse (40) that causes them to release from their previous state, a bias voltage is removed and reapplied, allowing the elements to move to the unaddressed state, and then the elements receive a second pulse (46). After receiving a second pulse, the elements assume an unaddressed state. In one embodiment, new address data is loaded during this unaddressed state, after which a bias is reapplied causing them to achieve the state corresponding to the new state. In another embodiment, the previous addresses are cleared during the unaddressed state, forcing the elements into an OFF state. In either embodiment, a reset pulse may be applied after either the load or clear step.

4 Claims, 1 Drawing Sheet

RESET SCHEME FOR SPATIAL LIGHT MODULATORS

This application claims priority under 35 U.S.C. § 119 (e) (1) of provisional application Ser. No. 60/006,139, filed Nov. 2, 1995.

BACKGROUND OF THE INVENTION

1. Field of the Invention

This invention relates to spatial light modulator display systems, more particularly to those systems that use pulse width modulation.

2. Background of the Invention

Spatial light modulator (SLM) systems, such as liquid crystal devices (LCDs), digital micromirror devices (DMDs) and actuated mirror arrays (AMAs) are becoming more common as the basis for display systems. A light source or sources illuminate an array of the individual devices. The array is addressed such that the light is modulated into images that are then projected onto a screen.

Some types of SLMs function in a digital fashion, where each individual element is either ON or OFF, where the ON state elements transfer light to the screen or viewing surface. These types of modulators typically use pulse width modulation. In pulse width modulation, the intensity of each pixel in the image is assigned a digital value, and the digital value is obtained by having the element on the array corresponding to the pixel ON for a time that equals that value.

For example, for a 4-bit system, where each pixel is formed from a digital word that it 4 bits wide, a given pixel could have any gray level from 0 to 15. A zero value pixel would require the element to be OFF for the entire frame. A pixel with a 15 value would require the element to be ON for the entire frame. A pixel with an intermediate value, 5 for example, would require a combination of periods. The most significant bit (MSB) of the word would have a value of 8, the next MSB 4, the next LSB 2, and the LSB 1.

The frame time would be divided into 15 time segments each of which is equal to 1 LSB time. The element would then have to be ON for a total of 5 LSB times. One LSB time would equal the frame time divided by 15. The frame time for a 60 Hz display system is ⅟₆₀, or 16.67 milliseconds. This would allow 16.67 milliseconds/15, or 1111 7secs. This gives plenty of time for the elements to be reset to receive new data if necessary. However, problems arise in a higher resolution, non-monochrome system.

For example, a three color, 8-bit system would require an LSB time of ⅟₆₀×⅓×⅟₂₅₅, or 21.8 7secs. This requires a modulator with individual elements that can be reset in that time. Resetting an element requires that the element be able to react to new data, move to the state required by the data and become stable. Very few modulators can switch that quickly.

One way to overcome this system is to limit resolution. However, this has been shown to cause visual artifacts in the final image. A system with at least 8 bits of resolution is really necessary to achieve a high quality image. Therefore, a need exists for a method of addressing that allows for high resolution while accommodating the element switching time on the modulator.

SUMMARY OF THE INVENTION

One embodiment of the invention is a method to address elements of a micromechanical spatial light modulator such that they can display data for a shorter time than their minimum settling time. A first pulse is initiated that causes the elements to release from their previous states. A previously existing stabilizing bias is then removed and reapplied such that the elements can move into states corresponding to new data. A second pulse is initiated and the bias removed prior to the elements stabilizing in the new state, causing the element to achieve an intermediate, or unaddressed, state. The data for the elements' next states are loaded and the bias reapplied, allowing them to achieve the corresponding state.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
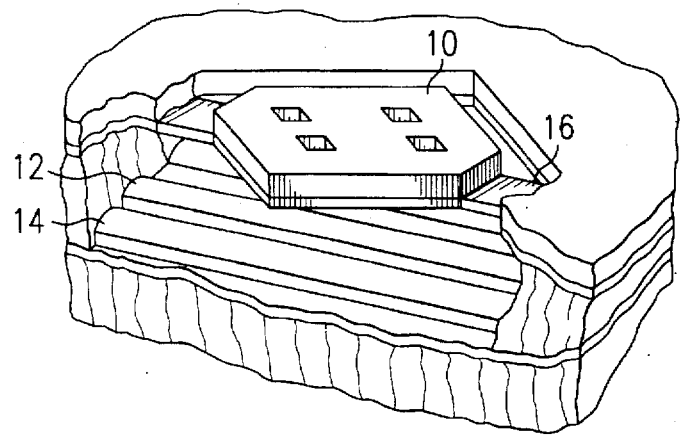
FIG. 1 shows one example of a prior art electromechanical spatial light modulator.

A pulse width modulation scheme for an 8-bit, three color system requires a modulator that can switch in 21.8 7 secs. The frame time is ⅟₆₀, or 16.67 milliseconds. Each color gets one-third of that, or 5.56 milliseconds. 8 bits of resolution requires 255 time segments, each of 21.8 7 secs long. The MSB is allocated 128 LSB times, for roughly half of the frame time. If the MSG is bit 7, then bit 6 is allocated 64 LSB times, bit 5 is allocated 32, etc. until bit 0 is left only 1 LSB time.

Very few modulators exist that can switch in 21.8 7 secs. Switching involves addressing the elements of the spatial light modulator, allowing them to react to the new data, and then having the elements move to their new state. The transition from one state to the other usually requires that there be some time period during which the element is settling into its state and the corresponding address data must be held constant.

One example of a modulator that has such a settling time conflict is shown in FIG. 1. The element 10 is one of an array of such elements situated on a substrate. In this example, the modulator element is addressed by an address electrode 12, which causes electrostatic attraction to build up between the element 10 and said address electrode 12. The element moves by rotating about its hinge 16, until the tip of the element 10 comes into contact with landing electrode 14.

When the element is in its final state, a bias voltage is applied to stabilize the position. The element is capable of rotating in the other direction, where another address electrode and landing electrode are under the other side of the element. The side to which the element rotates is determined by the incoming data. One side is designated the ON side, in which the element transfers light to the viewing surface. The other side is the OFF side.

Figure 2:
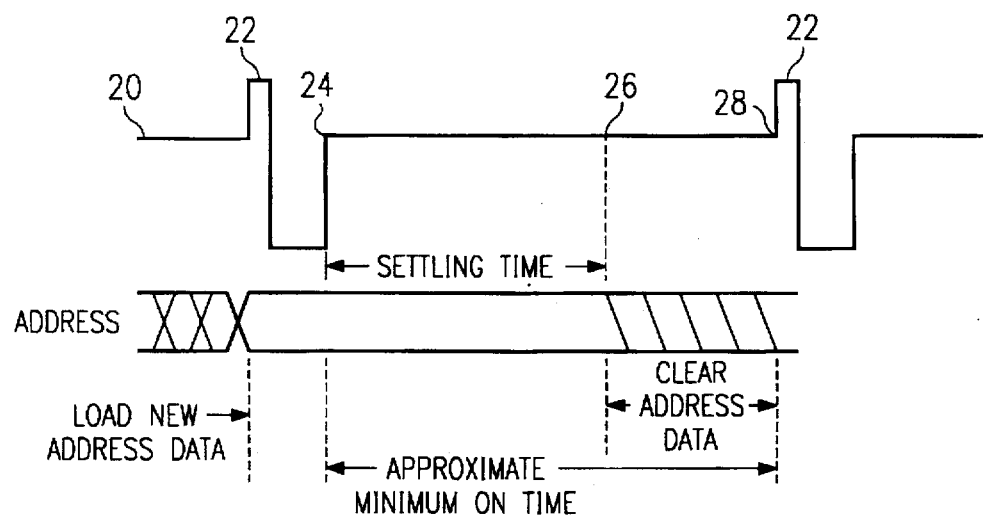
FIG. 2 shows a prior art reset waveform for resetting an electromechanical spatial light modulator.

The element can accept new data at the point when a reset pulse is sent to the element. During that pulse, the bias voltage is removed, allowing the element to transition to its new state. After the transition is initiated, the bias voltage is reapplied. This waveform is shown in FIG. 2.

The line 20 is the pulse waveform. At point 22, the reset pulse occurs. The bias voltage is removed until point 24, where the bias is restored. Just prior to point 22, the new address data was loaded. At the end of the new data load, the element moves to its new state determined by the data. At point 26, the element has settled into its new position. At that point it becomes necessary to clear the address data, so new address data can be loaded prior to the application of the reset pulse 22.

The timing conflict occurs in this area. The typical minimum bit time is the sum of the settling time and the time to clear the address data. This normally results in an LSB time of approximately 40 7 secs. Since an 8-bit system requires an LSB that is approximately half of that, a timing conflict results.

Figure 3:
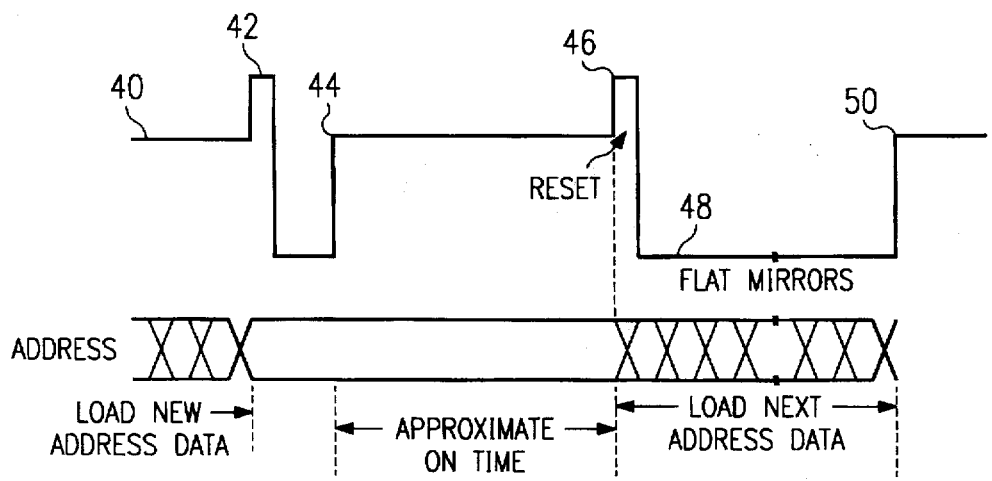
FIG. 3 shows one embodiment of a reset waveform for an addressing scheme with short bit times.

In one embodiment of the invention, shown in FIG. 3, a solution to this conflict eliminates some of this conflict. As in FIG. 2, the initial reset pulse occurs at point 42 on the address line 40. At point 44, the elements assume the state dictated by the new data. However, where previously at point 26 in FIG. 2, the element finally settled and was left in that state, here, at 46, a second reset pulse is applied.

The elements then assume their unaddressed state, as shown by trough 48. After the next address state has been loaded, the elements again assume the new state at point 50. At point 50, either the bias is reapplied by itself, or the bias is reapplied and a reset pulse accompanies it.

The advantages of this approach over that taken in FIG. 2 result from the addressability of the device after the second reset pulse. Previously, after short bit times, the device could not be set to a new data state until the elements had been reset to the OFF state and the device loaded with new data. Here, the elements are just moved to their unaddressed state and the data loaded, which eliminates the mirror settling time in the OFF state.

With this approach, the minimum bit time is no longer related to element settling time or data clear time. This, therefore, allows for the LSB time to be as small as necessary for an 8-bit system.

While the above example focuses on reflective, micromechanical elements in the number used for discussion, it is not limited to that application. There is no reason why the reset pulse which moves the elements to their unaddressed state, thereby creating a tristable element, could not be applied to other types of spatial light modulators. The timing parameters would be different, as would the means of resetting the elements.

In an alternate embodiment, after the second pulse the addresses can be cleared and all of the elements forced to the OFF state. Some optical systems set up around these modulators can receive stray light during the time the elements are in their unaddressed states. By forcing all of the elements to the OFF state, any stray light from the unaddressed state is minimized, improving the system contrast ratio.

Thus, although there has been described to this point a particular embodiment for a method and structure for a projection display pointer, it is not intended that such specific references be considered as limitations upon the scope of this invention except in-so-far as set forth in the following claims.

What is claimed is:

1. A method for causing a micromechanical spatial light modulator element to display data for times shorter than its settling time, comprising:

initiating a first pulse that causes said element to release from a previous state;

removing and reapplying a bias voltage such that said element may move to a state corresponding new data;

initiating a second pulse and removing said bias before said element has stabilized in a new state, thereby causing said element to achieve an unaddressed state;

loading data for said element's next state while the element is unaddressed; and reapplying said bias thereby causing the element to achieve said next state.

2. The method as claimed in claim 1 wherein said reapplying step further comprises applying a reset pulse.

3. A method for causing a micromechanical spatial light modulator element to display data for times shorter than its settling time, comprising:

initiating a first pulse that causes said element to release from a previous state;

removing and reapplying a bias voltage such that said element may move to a state corresponding new data;

initiating a second pulse and removing said bias before said element has stabilized in a new state, thereby causing said element to achieve an unaddressed state;

clearing data from said previous state such that all said elements are forced to an OFF state; and reapplying said bias thereby causing the element to achieve said next state.

4. The method as claimed in claim 3 wherein said reapplying step further comprises applying a reset pulse.

* * * * *